Oct. 7, 1952　　　　　J. J. ZETTS　　　　　2,613,044
FISHING REEL
Filed June 17, 1948　　　　　　　　　　2 SHEETS—SHEET 1
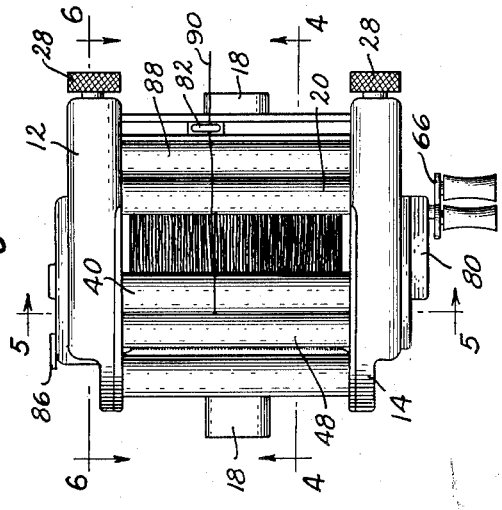
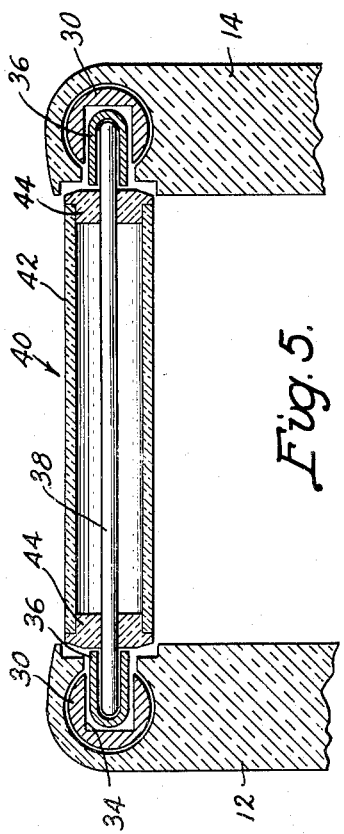
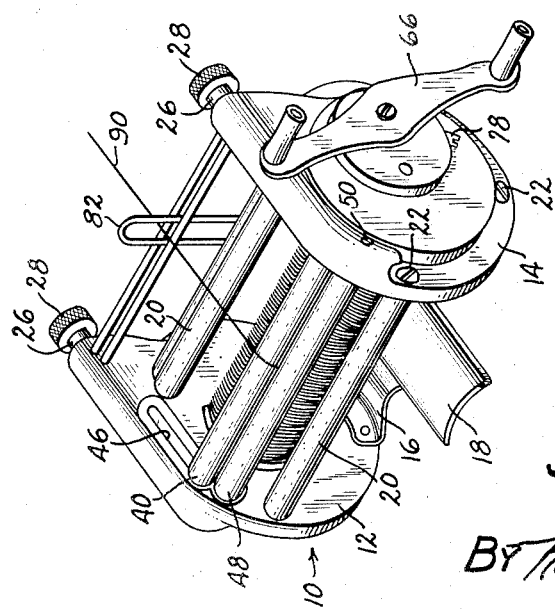
INVENTOR
JOSEPH J. ZETTS.
BY Raymond W. Colton
ATTORNEY Oct. 7, 1952   J. J. ZETTS   2,613,044
FISHING REEL
Filed June 17, 1948   2 SHEETS—SHEET 2

INVENTOR
JOSEPH J. ZETTS,

BY Raymond Wheaton
ATTORNEY

Patented Oct. 7, 1952

2,613,044

UNITED STATES PATENT OFFICE 2,613,044

FISHING REEL

Joseph J. Zetts, Gaithersburg, Md.

Application June 17, 1948, Serial No. 33,488

8 Claims. (Cl. 242—84.4)

This invention relates to reels, and particularly to fishing reels, in which the various effects of back lash have been eliminated without sacrificing the high degree of freedom required for satisfactory casting.

Whereas many of the prior inventors in this field have attempted to solve the problem by providing a pair of rollers beyond the line spool for maintaining the line between the spool and rollers under tension while unreeling, it has never occurred to them that the results can be achieved by discharging the line at a substantial angle to its ultimate direction.

Typical prior art disclosures dealing with the problem here involved, over which the present invention constitutes a marked improvement, will be found in the patents issued to Higbee, No. 1,398,721, dated November 29, 1921; Johnson, No. 1,960,491, dated May 29, 1934; James, No. 2,051,259, dated August 18, 1936; Babcock, No. 2,197,675, dated April 16, 1940; and, Nelson, No. 2,380,670, dated July 31, 1945.

By way of contrast to these patented disclosures, the present invention contemplates a reel comprising a frame, a base for securing the frame to a support, a line spool journalled in the frame, a feed roller carried by the frame and rotatably interconnected with the spool, and a line redirecting member yieldably biased towards the feed roller to define a line receiving bight lying in a plane inclined to the base at an angle exceeding 45°, which angle is preferably in excess of 60°. The line receiving bight is preferably substantially bisected by such a plane so that when the rollers are both in engagement with the line, the line will be driven upwardly and in some instances backwardly from between them and then through a line guide beyond the redirecting member or roller in a direction substantially parallel to the base. The line redirecting member is preferably an idler roller journalled in the frame provided with one or more springs for biasing it towards the feed roller. The line guide member is preferably located remotely from the feed roller so that when the line beyond the bight is under any appreciable tension, the idler roller will move against the force of its biasing spring or springs to permit separation of the line from contact with the feed roller.

The reel of the present invention may be characterized further as comprising a frame, a line feed spool journalled in the frame, a line feed roller carried by the frame and rotatably interconnected with the spool, a line redirecting member yieldably biased towards the feed roller to define a bight, the bight lying substantially on a plane intersecting the spool and guide means for receiving line beyond the redirecting member in a direction inclined to the plane at an angle between 45° and 90°. The bight so formed is substantially bisected by the plane intersecting the spool and the guide means for receiving line beyond the redirecting member or roller may provide a level wind arrangement. The line redirecting roller is preferably adjustably journalled in the frame so that any increase in tension on the line beyond a predetermined value will shift this roller in a direction away from the feed roller sufficiently to permit the line to clear the feed roller. A driving member is provided for actuating the spool and level wind means combined with shiftable means for selectively disengaging the driving means from the spool.

A fishing reel employing the present invention may have its attaching flange extending forwardly from the frame, a line spool journalled in the frame, a feed roller rotatably interconnected with the spool, a presser member biased towards the feed roller to form a bight for directing line upwardly from the frame, and a guide member beyond the bight for delivering line forwardly from the frame. The structure also contemplates means interconnecting the feed roller and spool to impart a relatively higher surface speed to the feed roller than to line on the spool at its full predetermined capacity. Since the attaching flange preferably extends fore and aft with respect to the frame, the spool and rollers will have substantially parallel axes perpendicular to this fore and aft direction. The presser or idler roller biased towards the feed roller may have the amount of bias adjusted so that the roller will yield at the desired value of tension imposed on the line.

A more complete understanding of the invention will follow from a description of the attached drawings wherein:

Fig. 1 is a perspective view of a reel embodying the present invention;

Fig. 2 is a plan view of the reel depicted in Fig. 1;

Fig. 5 is a fragmentary sectional elevation taken along line 5—5 of Fig. 2;

Figure 6:
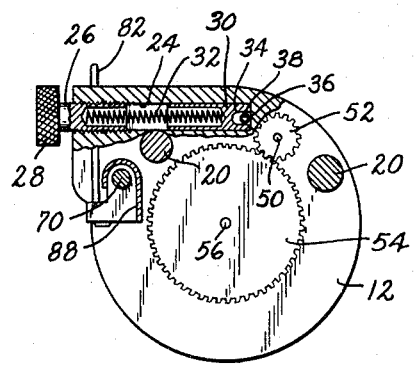
Fig. 6 is a section taken along line 6—6 of Fig. 2.

The reel depicted in these figures comprises a frame 10 having end plates 12 and 14 interconnected by a base 16 having an attaching flange 18 extending fore and aft, and by transverse rods or bars 20 suitably secured to the plates by means of screws 22 as is customary in fishing reels generally. Each of the end plates is provided with a blind bore 24 threaded at its open forwardly directed end to receive a threaded plug 26 having a knurled head 28, as shown in section in Fig. 6. Each of these bores receives a reciprocable piston 30 which is biased towards the closed end of the bore by means of a spring 32 interposed between the plug 26 and the piston 30. The ends of the pistons 30 are provided with notches 34 formed partially therethrough as will be clear from Fig. 5, for the reception of bearings 36 which in turn receive the ends of a shaft 38 carrying the roller 40 defined by an open cylinder 42 having end plugs 44. This roller constitutes a presser, redirecting, or idler member, yieldable against the force of the springs 32 for movement in the inwardly opening slots 46 provided by the end plates 12.

The roller 40 defines a line receiving bight with a feed roller 48 whose shaft 50 is journalled in the frame and has secured thereto a spur gear 52 in mesh with a gear 54 secured to the shaft 56 on which the spool 58 is fixed. Since it is located relatively rearwardly of the reel the roller 48 can be conveniently engaged by the thumb of the user to produce a braking effect without necessitating contact with the line itself.

Figure 7:
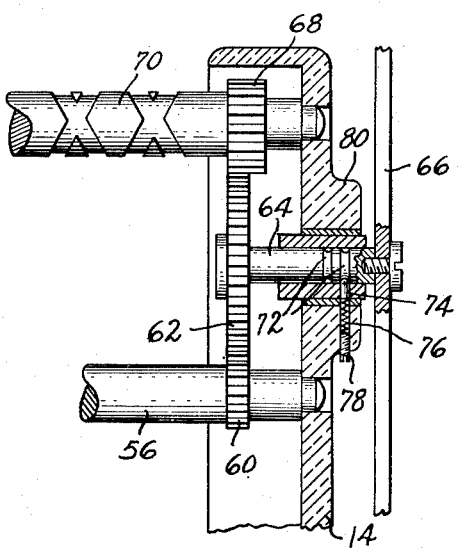
Fig. 7 is a fragmentary section taken along line 7—7 of Fig. 3.

The other end of the spool shaft carries a spur gear 60 in selective engagement with a spur 62 mounted on the driving shaft 64 to which the crank handle 66 is secured. The driving gear 62 is maintained in continuous mesh with a relatively thick spur gear 68 secured to the shaft of the level wind reversing screw 70. As depicted in Fig. 7, the driving shaft 64 is axially movable to either of the two positions corresponding to the grooves 72 cooperating with a detent 74 biased by a spring 76 whose effective force can be adjusted by means of a set screw 78 projecting from the boss 80 formed on the end plate 14. When the shaft 64 is moved to the right as viewed in Fig. 7, the spurs 60 and 62 will become disengaged, to produce a condition desired for casting, but the spurs 62 and 68 will remain in mesh so that the level wind nut 81 can be moved to a position that will bring the line to be wound in registry with that already on the spool. The level wind guide 82 carried by the nut 81, is of a customarily inverted U type travelling back and forth between a pair of rods 84 whose ends are received in the end plates. The present invention may be incorporated in many types of reels, the structural details of which may vary appreciably. The reel depicted in the accompanying drawings has been made almost entirely of clear plastic, and it includes a click button 86 and a guard 88 for the reversing screw as have been shown.

Assuming that line is to be cast from the reel, the shaft 64 will be retracted until the gears 60 and 62 are no longer in mesh, whereupon the line will be cast in the usual manner. As long as there is sufficient tension on the line 90 to overcome the force of the biasing spring 32, the roller 40 will advance in its slots 46 so that the line being drawn from the spool 58 will be out of engagement with the feed roller 48. As soon as the tension on the line becomes small enough to be overcome by the force of the springs 32, which can be adjusted by advancing or retracting the threaded plugs 26, the roller 40 will force the line into contact with the feed roller 48 whose surface speed is always greater than the speed of the line being discharged from the spool by a predetermined amount. By properly selecting the gears 52 and 54, the line between the spool and the bight will always be under tension during casting rendering it impossible for the line to wind reversely upon the spool as so frequently occurs with reels of commercially known types.

Figure 3:
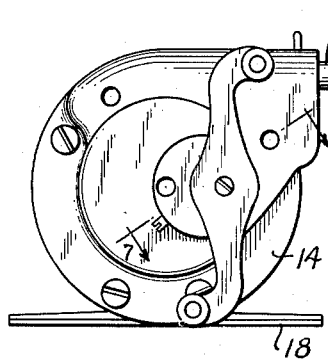
Fig. 3 is an elevation of the crank end of the reel.
Figure 4:
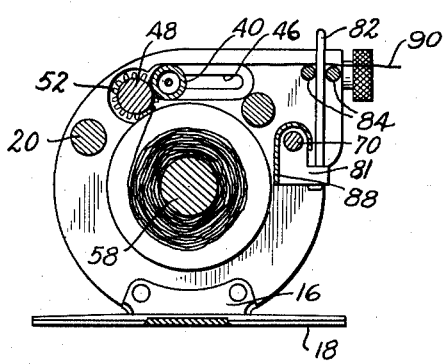
Fig. 4 is a sectional elevation taken along line 4—4 of Fig. 2.

Referring to Fig. 4 of the drawings, and bearing in mind the relative surface speeds involved, it will be evident that when the hook end of the fishing line strikes the surface towards which it has been cast, its velocity will be materially reduced, which will be reflected by a sudden slack throughout the length of the line. The inertia of the spool and its interconnected feed roller 48 will cause them to continue expelling line at a rate in excess of that required at this point, but since the line is delivered therefrom upwardly, and in many instances somewhat backwardly, there is little danger of fouling the line on the reel or on the rod. The bight defined by the feed roller and idler roller is substantially bisected by a plane intersecting the spool and inclined to the base at an angle exceeding 45°. Such a plane in the reel depicted, intersects the center of the spool and defines an angle of approximately 70° in the second quadrant with respect to the flange or base of the reel. Under these circumstances, line from the spool will be directed upwardly and rearwardly, and then forwardly, providing an arrangement which avoids fouling of line so frequently experienced with reels of ordinary manufacture, including those of the types shown by the prior art hereinabove considered.

Whereas but one form of reel embodying the present invention has been shown and described, this disclosure will suggest variations and modifications to those skilled in the art, along lines which have been recognized already by the present inventor. Accordingly, the present invention should not be restricted to the examples specifically disclosed herein beyond the scope of the appended claims.

I claim:

1. A fishing reel having a frame, an attaching flange extending forwardly from said frame, a line spool journalled in said frame, a feed roller rotatably interconnected with said spool, a presser member biased towards said feed roller to form a bight for delivering line upwardly and rearwardly from said frame, and a guide member beyond said bight for delivering line forwardly from said frame.

2. A fishing reel having a frame, an attaching flange for a fishing rod extending forwardly from said frame, a line spool journalled in said frame, a feed roller having an axis fixed in said frame rotatably interconnected with said spool, a presser member biased towards said feed roller to form a bight for delivering line upwardly away from said frame and the plane of the flange at an angle exceeding 45° with respect to the forward direction of said flange, and a guide member beyond said bight for delivering line forwardly from said frame.

3. A fishing reel having a frame, an attaching flange for a fishing rod extending forwardly from said frame, a line spool and a feed roller journalled in said frame, gearing interconnecting said feed roller with said spool to impart a relatively higher surface speed to the feed roller than that attained by the spool periphery, a presser member biased towards said feed roller to form a bight for delivering line upwardly away from said frame and the plane of the flange at an angle always exceeding 45° with respect to the forward direction of said flange, and a guide member beyond said bight for delivering line forwardly from said frame.

4. A fishing reel having a frame, an attaching flange for a fishing rod extending forwardly from said frame, a line spool having a predetermined line capacity journalled in said frame, a feed roller journalled in said frame, gearing interconnecting said roller with said spool to impart a relatively higher surface speed to said feed roller than attained by line on said spool at full capacity, a presser member biased towards said feed roller to form a bight for delivering line upwardly away from said frame and the plane of the flange at a minimum angle exceeding 45° with respect to the forward direction of said flange, and a guide member beyond said bight for delivering line forwardly from said frame.

5. A fishing reel having a frame, an attaching flange for a fishing rod extending fore and aft with respect to said frame, a line spool journalled in said frame, a feed roller carried on a fixed axis in said frame rotatably interconnected through gearing with said spool, a presser roller biased towards said feed roller to form a bight for delivering line upwardly away from said frame and the plane of the flange at an angle exceeding 45° with respect to the forward direction of said flange, said spool and rollers having substantially parallel axes perpendicular to the fore and aft direction of said flange, and a guide member forward of said bight for delivering line forwardly from said frame.

6. A fishing reel having a frame, an attaching flange for a fishing rod extending forwardly from said frame, a line spool journalled in said frame, a feed roller rotatably interconnected through gearing with said spool, a presser roller biased towards said feed roller to form a bight for delivering line upwardly away from said frame and the plane of the flange at an angle exceeding 45° with respect to the forward direction of said flange, means for adjusting the bias on said presser roller, and a guide member beyond said bight for delivering line forwardly from said frame.

7. A fishing reel having a frame, an attaching flange for a fishing rod extending forwardly from said frame, a line spool journalled in said frame, a feed roller rotatably interconnected through gearing with said spool, a presser member biased towards said feed roller to form a bight for delivering line upwardly away from said frame and the plane of the flange at a minimum angle exceeding 60° with respect to the forward direction of said flange, and a guide member beyond said bight for delivering line forwardly from said frame.

8. A fishing reel having a frame, an attaching flange for a fishing rod extending forwardly from said frame, a line spool journalled in said frame, a feed roller rotatably interconnected through gearing with said spool, a presser member biased towards said feed roller to form a bight for delivering line upwardly away from said frame and the plane of the flange at a minimum angle approximating 70° with respect to the forward direction of said flange and a guide member beyond said bight for delivering line forwardly from said frame.

JOSEPH J. ZETTS.

REFERENCES CITED

The following references are of record in the file of this patent:

UNITED STATES PATENTS

| Number | Name | Date |
|---|---|---|
| 1,041,376 | Toepfer | Oct. 15, 1912 |
| 1,579,076 | Case | Mar. 30, 1926 |
| 1,960,491 | Johnson | May 29, 1934 |
| 2,051,259 | James | Aug. 18, 1936 |
| 2,197,675 | Babcock | Apr. 16, 1940 |
| 2,201,476 | Catucci | May 21, 1940 |
| 2,209,166 | McArthur | July 23, 1940 |
| 2,380,670 | Nelson | July 31, 1945 |
| 2,458,298 | Polevoy | Jan. 4, 1949 |
| 2,504,631 | Bishoff | Apr. 18, 1950 |
| 2,553,589 | Hull et al. | May 22, 1951 |